July 22, 1952     C. T. KINGSTON     2,604,331
TRAILER HITCH
Filed Oct. 5, 1951
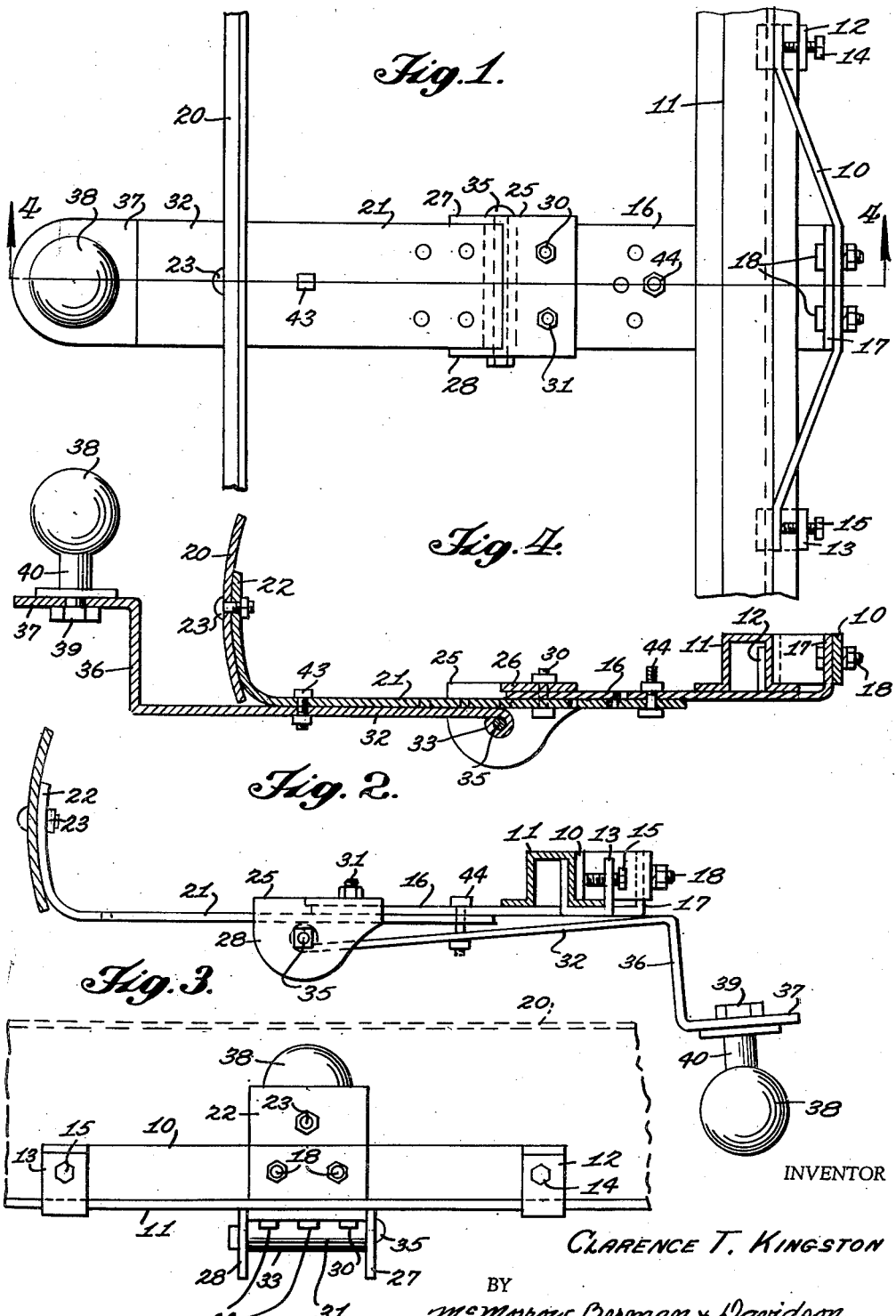
INVENTOR
CLARENCE T. KINGSTON
BY McMorrow, Berman & Davidson
ATTORNEYS Patented July 22, 1952

2,604,331

UNITED STATES PATENT OFFICE 2,604,331

TRAILER HITCH

Clarence T. Kingston, Los Angeles, Calif., assignor of ten per cent to Maggie W. Reed, Los Angeles, Calif.

Application October 5, 1951, Serial No. 249,883

3 Claims. (Cl. 280—33.44)

This invention relates to trailer hitches and more particularly to a trailer hitch accessory adapted to be mounted on an automobile and arranged to fold out of sight when not in use.

It is among the objects of the invention to provide an improved trailer hitch adapted to be mounted on an automobile between the rear cross member of the automobile frame and the rear bumper of the automobile and which is adjustable in length to accommodate the hitch to differences in the distance between the rear frame cross member and rear bumper on different automobiles; which includes an adjustable length mounting part and a ball carrying part hinged to the mounting part for movement between an operative position in which the ball carried by the ball carrying part is disposed rearwardly of the rear bumper and an inoperative position in which both the mounting part and the ball carrying part are concealed below the automobile frame; which can be installed on an existing automobile with no material modification of the automobile construction; and which is simple and durable in construction, economical to manufacture and easy to install, and positive and effective in use.

Other objects and advantages will become apparent from a consideration of the following description and the appended claims in conjunction with the accompanying drawing wherein:

Figure 1 is a top plan view of a trailer hitch illustrative of the invention, associated parts of an automobile being fragmentarily illustrated;

Figure 2 is a side elevational view of the trailer hitch illustrated in Figure 1;

Figure 3 is a front elevational view of the trailer hitch; and

Figure 4 is a longitudinal cross sectional view on the line 4—4 of Figure 1.

With continued reference to the drawing, the trailer hitch comprises a bridge bar 10 which is longitudinally bowed and has its ends disposed against the front side of a rear cross member 11 of an automobile frame, the frame rear cross member being of channel shaped cross section and disposed with its open side downwardly directed. The center portion of the bridge bar 10 is faced forwardly of the frame member 11 and the ends of the bridge bar are deflected to a position in which their surfaces at the concave side of the bar are substantially in a common plane and bear against the front side of the frame cross member 11, as explained above. U-shaped clips 12 and 13 are disposed one at each end of the bar 10 and each of these clips has one leg disposed within the frame member 11 and its other end spaced from the outer side of the corresponding end portion of the bridge bar. Set screws 14 and 15 extend through tapped holes in the legs of the clips 12 and 13 respectively, spaced from the corresponding ends of the bar 10 and bear against the corresponding ends of the bar to firmly connect the bar to the associated frame member 11.

A flat bar 16 of elongated, rectangular cross sectional shape has one end perpendicularly offset or upturned, as indicated at 17, and disposed against the side of the bridge bar 10 adjacent the frame member 11 substantially symmetrically with the mid-length location of the bridge bar. The bridge bar and the upturned end portion 17 of the bar 16 are provided with registering apertures spaced at respectively opposite sides of the mid-length location of the bridge bar and bolts 18 extend through these apertures and firmly secure the bar 16 to the bridge bar in a position such that the bar 16 extends under the frame member 11 and rearwardly therefrom to a location between the frame member 11 and the rear bumper 20 of the associated automobile.

A flat bar 21 of elongated, rectangular cross sectional shape, corresponding in dimensions to the bar 16, has one end perpendicularly offset or upturned, as indicated at 22, and disposed against the inner side of the rear bumper 20 of the automobile substantially symmetrical with the mid-length location of the rear bumper. The rear bumper and the upturned end portion 22 of the bar 21 are provided with registering apertures and a bolt 23 extends through these apertures and secures the bar 21 to the associated rear bumper of the automobile.

The bars 16 and 21 overlap between the frame member 11 and the rear bumper 20 and are provided with apertures, some of which are spaced apart along the mid-width locations of the two bars, and some of which are located near the opposite edges of the bars, the bar 21 having a series of such apertures disposed one along each edge thereof with the apertures in each series spaced apart longitudinally of the bar.

The two bars 16 and 21 can be secured together at selected positions of longitudinal adjustment relative to each other to accommodate the trailer hitch to differences in the distance between the frame near cross member 11 and the rear bumper 20 of different automobiles, and when so connected together, constitute the drawbar assembly of the trailer hitch.

A saddle 25 of U-shaped cross section is mounted on the bars 16 and 21 between the frame member 11 and the rear bumper 20 and has a flat bight portion 26 disposed on the upper side of the bar 16 which is, in turn, disposed on the upper side of the bar 21, and legs 27 and 28 constituting apertured lugs which depend perpendicularly from the bight portion, one at each side of the bar 21. The bight portion 26 is provided with apertures disposed one near each end thereof and bolts 30 and 31 extend through the apertures in the bight portion of the saddle 25, through the registering apertures in the bar 16, and through a selected pair of apertures in the bar 21 to simultaneously secure the saddle to the bars 16 and 21 and secure the bars 16 and 21 together at a selected position of longitudinal adjustment relative to each other.

A hitch bar 32 has at one end a sleeve formation 33 which is disposed between the legs 27 and 28 of the saddle, and a hinge pin 35 extends through the sleeve formation 33 and through the apertures in the saddle legs 27 and 28 to hingedly connect the hitch bar 32 at one end to the saddle 25.

Near its other end the bar 32 is provided with an offset including a portion 36 extending perpendicularly from the remainder of the bar and a portion 37 extending perpendicularly from the end of the portion 36 remote from the remainder of the bar and in a direction opposite that in which the remainder of the bar extends from the perpendicularly disposed portion 36. The portion 37 is provided with the aperture and a ball element 38 is secured to the portion 37 by a nut 39 threaded onto the stem 40 of the ball element, which stem extends through the aperture in the portion 37.

In the operative position of the hitch, the bar 32 overlaps the under side of the bar 21 and extends rearwardly of the rear bumper 20 of the associated automobile positioning the ball element 38 at a location spaced rearwardly from the associated rear bumper. The bar 32 is releasably secured in this operative position by a bolt 43 extending through registering apertures in the bar 21 near the upturned end portion 22 of the latter and in the bar 32.

In the inoperative condition of the trailer hitch the bar 32 overlaps the bar 16 and is held in this position by a bolt 44 which extends through registering apertures in the bars 16 and 21 and through an aperture in the bar 32. When the bar 32 overlaps or underlies the bar 16 in the inoperative condition of the trailer hitch, the entire hitch assembly is disposed below the automobile frame and below the rear portion of the automobile body and the shield normally provided between the rear end of the body and the rear bumper, so that the hitch assembly is entirely concealed beneath the automobile. The hitch assembly can be kept on the automobile at all times, but its presence will not be apparent, except when it is being used.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A trailer hitch assembly for an automobile having a rear frame cross member and a rear bumper spaced from the rear cross member comprising a first bar longitudinally curved and adapted to be disposed at the forward side of an automobile rear frame cross member, screw clamps engaged with said first bar one at each end thereof for securing said first bar to an associated frame cross member, a second bar having a flat shape and an upturned end disposed against said first bar intermediate the ends of the latter, a third bar of flat shape having an upturned end adapted to be placed against and secured to an associated rear bumper, said second and third bars overlapping between the upturned ends thereof, means securing said second and third bars together in selected positions of longitudinal adjustment relative to each other, a saddle mounted on the overlapping portions of said second and third bars and secured thereto, a fourth bar hingedly connected at one end to said saddle and having a length greater than the distance between said saddle and the upturned end of said third bar, a ball constituting one element of a ball and socket joint secured to said fourth bar near the other end of the latter, and a fastener engaged between said second and third bars and said fourth bar alternatively holding said fourth bar in overlapping relationship to said second bar or said third bar.

2. A trailer hitch assembly for an automobile having a rear frame cross member and a rear bumper spaced from the rear cross member comprising a first bar longitudinally bowed and adapted to be disposed at the forward side of an automobile rear frame cross member, screw clamps engaged with said first bar one at each end thereof for securing said first bar to an associated frame cross member, a second bar having an angularly disposed end portion secured to said first bar intermediate the ends of the latter, a third bar having an angularly disposed end portion adapted to be placed against and secured to an associated rear bumper, said second and third bars overlapping between the angularly disposed end portions thereof, a saddle mounted on the overlapping portions of said second and third bars, means securing said saddle and said second and third bars together with said second and third bars in a selected position of longitudinal adjustment relative to each other, a fourth bar hingedly connected at one end to said saddle and having a length greater than the distance between said saddle and the angularly disposed end portion of said third bar, and a ball constituting one element of a ball and socket joint secured to said fourth bar near the other end of the latter.

3. A trailer hitch assembly for an automobile having a rear frame cross member and a rear bumper spaced from the rear cross member comprising a first bar longitudinally bowed and adapted to be disposed at the forward side of an automobile rear frame cross member, screw clamps engaged with said first bar one at each end thereof for securing said first bar to an associated frame cross member, a second bar having an angularly disposed end portion secured to said first bar intermediate the ends of the latter, a third bar having an angularly disposed end portion adapted to be placed against and secured to an associated rear bumper, said second and third bars overlapping between the angularly disposed end portions thereof, a saddle mounted on the overlapping portions of said second and third bars, means securing said saddle and said second and third bars together with said second and third bars in a selected position of longitudinal adjustment relative to each other, a fourth bar hingedly connected at one end to said saddle and having a length greater than the distance between said saddle and the angularly disposed end portion of said third bar, and a ball constituting one element of a ball and socket joint secured to said fourth bar near the other end of the latter, said saddle comprising a member of U-shaped cross section having a flat bight portion seated on the overlapping portions of said second and third bars and legs depending one at each side of said overlapping portions and provided with apertures, said fourth bar having a sleeve formation at said one end thereof, and a bolt extending through the apertures in the legs of said saddle and through the sleeve formation in said fourth bar hingedly connecting said fourth bar to said saddle.

CLARENCE T. KINGSTON.

REFERENCES CITED

The following references are of record in the file of this patent:

UNITED STATES PATENTS

| Number | Name | Date |
|---|---|---|
| 2,097,006 | Weis | Oct. 26, 1937 |
| 2,151,920 | Jandus et al. | Mar. 28, 1939 |
| 2,408,531 | Riemann et al. | Oct. 1, 1946 |
| 2,485,743 | Koback | Oct. 25, 1949 |
| 2,549,941 | Smith | Apr. 24, 1951 |